Patented June 11, 1935

2,004,463

UNITED STATES PATENT OFFICE 2,004,463

PRODUCTION OF HYDRAULIC CEMENT

Gerald Otley Case, Sevenoaks, England, assignor, by mesne assignments, to Carbo Plaster Limited, Westminster, England No Drawing. Application September 18, 1931, Serial No. 563,679. In Great Britain August 26, 1931

1 Claim. (Cl. 106—24)

This invention is an improvement in or modification of the invention set forth in my prior patent specification No. 1,848,834 relating to the production of hydraulic cement.

The object of the present invention is to provide a further means of manufacturing a cheap and strong mortar or cement.

According to the present invention hydraulic cement comprises a mixture of ground calcium carbonate and a clinker derived from burning a mixture of calcium carbonate and aluminium silicate, the percentage of the ground calcium carbonate being 85% by weight of the total mixture, said clinker being ground to British Portland cement standard of fineness and the added carbonate being ground to a degree of fineness not greater than that to which the clinker is ground and not sufficiently coarse to leave any appreciable residue on a 76 mesh per inch sieve. On the addition of water to a mixture constituted as above, a portion of the added carbonate in the ratio of 8 parts of carbonate to 1 part of that calcium oxide which, on the addition of water, is liberated from the tri-calcium silicate in the clinker, will combine with said calcium oxide, the remainder of the said carbonate acting as an aggregate.

This calcium oxide which is contained in the tri-calcium silicate in the clinker and which is freed on the addition of water, is known as "free calcium oxide." Normally when water is added to Portland cement clinker the calcium oxide is liberated and combines with the water to form calcium hydroxide. This reaction produces considerable heat and causes undesirable cracking of the cement. Normally in Portland cement this free calcium oxide amounts to 5 to 12% of cement.

It is intended throughout this specification that the term "free lime" or "free calcium oxide" shall mean calcium oxide which on the addition of water is liberated from the tri-calcium silicate present in the cement.

The amount of carbonate to be added depends upon the quantity of free calcium oxide in the cement. If, for example, the cement clinker contains 88 parts of combined calcium oxide and aluminium and 12 parts of free calcium oxide (CaO), then about 567 parts of calcium carbonate (CaCO₃) would be added, giving in the finished product approximately 2% free calcium oxide (CaO), 85% calcium carbonate, and 13% combined calcium oxide and aluminium silicate.

On the addition of water to this material about 96 parts of calcium carbonate will combine with the free calcium oxide leaving about 471 parts of carbonate to act as an aggregate.

Although calcium carbonate and natural limestone rock are the preferred materials for use in the production of hydraulic cement according to the invention, any natural rock containing a large percentage of calcium carbonate may be employed.

The clinkering material required for the invention differs in no way from the ordinary Portland cement clinker, since to form this clinker a 3:1 mixture of carbonate to silicate and free silica may be used and the kiln need only be at the usual temperature for forming Portland cement clinker, that is to say, about 1400° C. It is unnecessary for forming a clinker to use temperatures above this, providing the proportion of 3:1 of carbonate to silicate are used.

The degree of fineness to which the materials are ground is important, since the cement clinker must be ground to British Portland cement standard of fineness and the added carbonate must be of a fineness not greater than that of the clinker.

Experiment has shown that if the carbonate is ground so as to be finer than the clinker, for example so as to pass a 200 mesh per inch sieve, a very poor result is obtained.

In one form of carrying the invention into effect cement clinker (made by intimately mixing together, calcareous and argillaceous or other silica and alumina bearing materials, and burning them to a clinkering temperature) is obtained, and the amount of free calcium oxide in the clinker is ascertained. Supposing the free calcium oxide (CaO) is found to be 10%, then to the 90 parts combined calcium oxide and aluminous silicate and 10 parts free calcium oxide, there is added 567 parts of calcium carbonate which has been ground to a fineness not so great as that of the clinker but not so coarse as to leave any appreciable residue on a 76 mesh per inch sieve. In this case, of the 567 parts of carbonate about 80 parts will combine with the free calcium oxide leaving 487 parts to act as an aggregate.

If it is desired to produce a slow setting cement a suitable quantity of any well known retarder or Portland cement, such as potassium dichromate, boric acid, borax, sodium sulphate, potassium sulphate or calcium sulphate, or the like may be added to the mixture of cement clinker and calcium or other carbonate before grinding.

An apparatus for carrying the invention into effect may comprise one conveyor system carrying limestone rock, and another system carrying aluminium silicate and free silica to a mixer, and after mixing, another conveyor system carrying the mixture to a kiln to produce the clinker, which is carried in turn to a grinding mill, the ground clinker passing to a mixing chamber where it is mixed with calcium carbonate which has been ground in a second grinding mill.

The manufacture of a hydraulic cement according to the invention obtains a quick setting strong cementitious mixture, which is cheaper to produce than the ordinary Portland cement.

What I claim is:

Hydraulic cement comprising a dry granular mixture of ground calcium carbonate rock and a clinker derived from burning a mixture of calcium carbonate and aluminium silicate wherein the ground carbonate constitutes 85% by weight of the total mixture, said clinker being ground to British Portland cement standard of fineness and the added carbonate being ground to a degree of fineness not greater than that to which the clinker is ground and not sufficiently coarse to leave any appreciable residue on a 76 mesh per inch sieve, whereby on the addition of water a portion of the added carbonate in the ratio of 8 parts of carbonate to 1 part of that calcium oxide which on the addition of water is liberated from the tri-calcium silicate in the clinker, will combine with said calcium oxide, the remainder of said carbonate acting as an aggregate.

GERALD OTLEY CASE.